Nov. 17, 1970  R. J. CUTTER  3,541,309
MERCHANDISING SYSTEM

Filed June 26, 1967

INVENTOR.
ROBERT J. CUTTER
BY Hood, Gust & Irish
ATTORNEYS

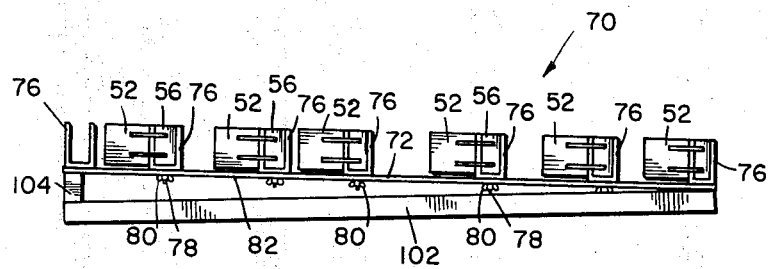
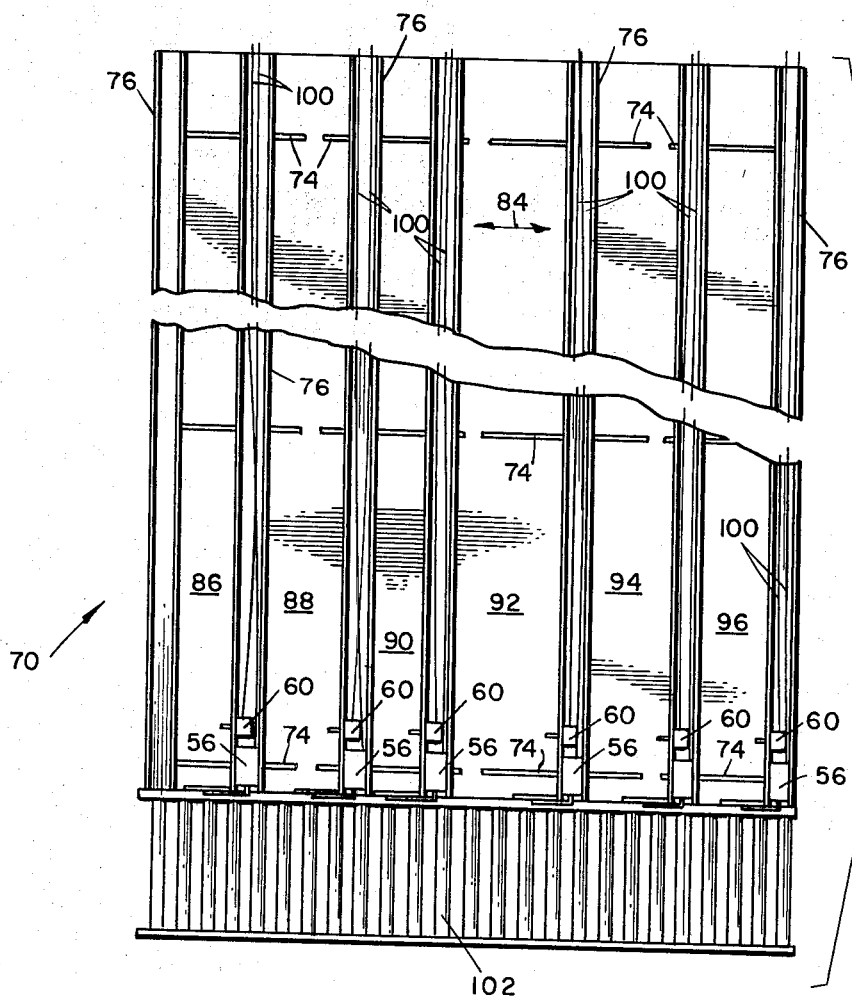

United States Patent Office 3,541,309
Patented Nov. 17, 1970

3,541,309
MERCHANDISING SYSTEM
Robert J. Cutter, Fort Wayne, Ind., assignor to Cutter's Inc., Fort Wayne, Ind., a corporation of Indiana
Filed June 26, 1967, Ser. No. 648,550
Int. Cl. G06k *3/08;* H04q *3/02*
U.S. Cl. 235—61.7                    10 Claims

ABSTRACT OF THE DISCLOSURE

A merchandising system comprising a plurality of display means, each of which represents a certain type of merchandise, a computer, first switch means associated with each display means and connected to the computer, a readout device, and second switch means connected between the computer and the readout device. A manually actuated coded means is provided for selectively operating each of the first switch means, thereby to register in the computer the identity of a purchaser and the quantity of merchandise ordered by the purchaser. The same coded means is then used to operate the second switch means which operates the computer to sum all of the purchases made by the purchaser using the coded means and to register the sum in the readout device. In preferred embodiments of the invention, the computer operates a material handling system which delivers the selected merchandise to a loading station.

BACKGROUND OF THE INVENTION

Field of the invention

The present invention relates to merchandising systems, and more particularly to computer-controlled merchandising systems wherein a computer is used to register the identity of the purchaser and the quantity of each type of merchandise ordered by the purchaser, to sum all of the purchases made by the purchaser and to operate a material handling system arranged to transport the merchandise selected by the purchaser to a central loading station.

Description of the prior art

The use of computers or computer-type equipment to control selected phases of a merchandising system is known. See, for instance, U.S. Pat. 3,304,416 issued Feb. 14, 1967. However, prior art merchandising systems have not included a computer which controls substantially all phases of the system, including registering the identity of a purchaser, registering the quantity of each type of merchandise selected by the purchaser, summing all of the purchases made by the purchaser, providing a bill which must be paid by the purchaser, registering the reduction of inventory of each type of merchandise when a purchase is made, and, once the bill is paid by the purchaser, operating a material handling system which delivers the merchandise to a central loading station.

SUMMARY OF THE INVENTION

The merchandising system of the present invention comprises a plurality of display cases, each of which contains or is arranged to represent a certain type of merchandise which is stored in a particular chute. A tumbler-operated switch means is arranged adjacent each display case, each switch means being connected to a central computer. Each purchaser is provided with a key which is coded to register in the computer the identity of the purchaser, the key being provided for selectively operating the switch means associated with the various display cases. A readout device is connected to the computer through a second tumbler-operated switch means which may be operated by the keys provided all purchasers, thereby to operate the computer to sum all of the purchases made by each purchaser using a particular key and to register the sum in the readout device. After a purchaser has paid his bill, the key which he used to select merchandise may also be used to operate switch means which operates the computer which, in turn, operates a material handling system to deliver the selected merchandise to a central loading station.

The key is, therefore, a manually actuated coded means for selectively operating a plurality of switches, each of which represents a certain type of merchandise and each of which operates the computer to register a selection made by the purchaser having the key.

The readout device and the switch which operates the computer to sum all of the purchases made by a particular purchaser and to register the sum in the readout device are preferably located in a cashier's stand. Thus, after a purchaser makes several selections using a key, he turns the key over to the cashier and the cashier uses the key to arrive at a bill which the purchaser must pay.

It is an object of the present invention, therefore, to provide a merchandising system which comprises a computer arranged to control substantially all phases of the system, including registering the identity of a purchaser, registering the quantity of each type of merchandise selected by the purchaser, registering the reduction of inventory of each type of merchandise selected by the purchaser, providing a bill for all of the purchases made by the purchaser and, when the purchaser has paid the bill, operating a material handling system which delivers the selected merchandise to a central loading station.

Another object of the present invention is to provide such a merchandising system further comprising manually actuated coded means with which each purchaser may make his selection of merchandise.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings wherein:

FIG. 6 is an end view of another chute structure, the structure being arranged to provide chutes of adjustably variable width; and FIG. 7 is a top view of the chute structure of FIG. 6.

DESCRIPTION OF THE PREFERRED EMBODIMENT

Figure 1:
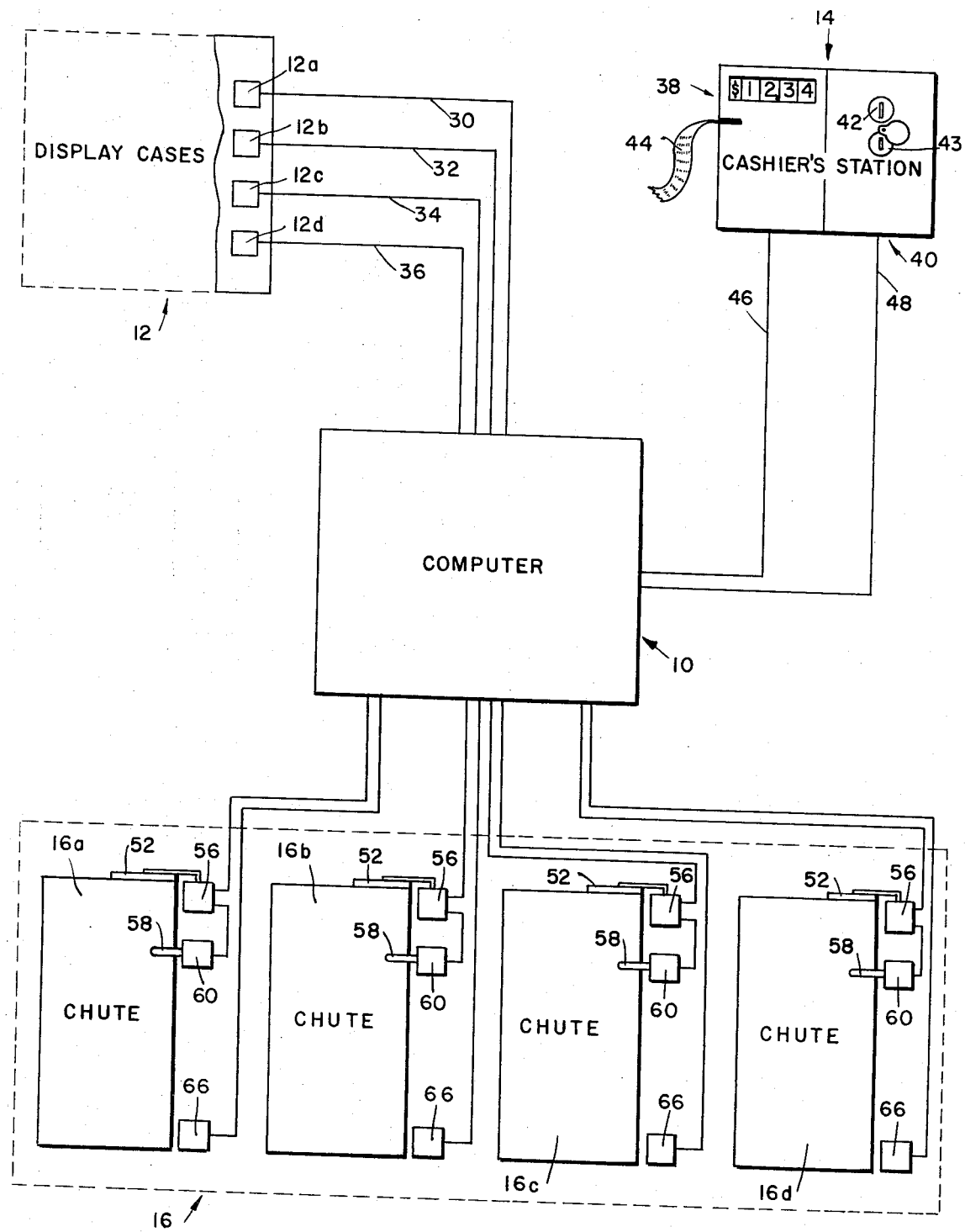
FIG. 1 is a block diagram of the merchandising system of the present invention.

The merchandising system of the present invention comprises a computer 10, a plurality of display cases 12, a cashier's station 14 and a plurality of chutes 16, all of which are indicated generally by their respective reference numbers in FIG. 1. To simplify the explanation of the block diagram of FIG. 1, there are illustrated four display cases 12a, 12b, 12c and 12d and four chutes 16a, 16b, 16c and 16d. The chute 16a contains merchandise which is displayed in the case 12a, the chute 16b contains merchandise which is displayed in the display case 12b, the chute 16c contains merchandise which is displayed in the display case 12c and the chute 16d contains merchandise which is displayed in the display case 12d. Thus, chute 16a is associated with display case 12a, chute 16b is associated with display case 12b, chute 16c is associated with display case 12c and chute 16d is associated with display case 12d.

Figure 2:
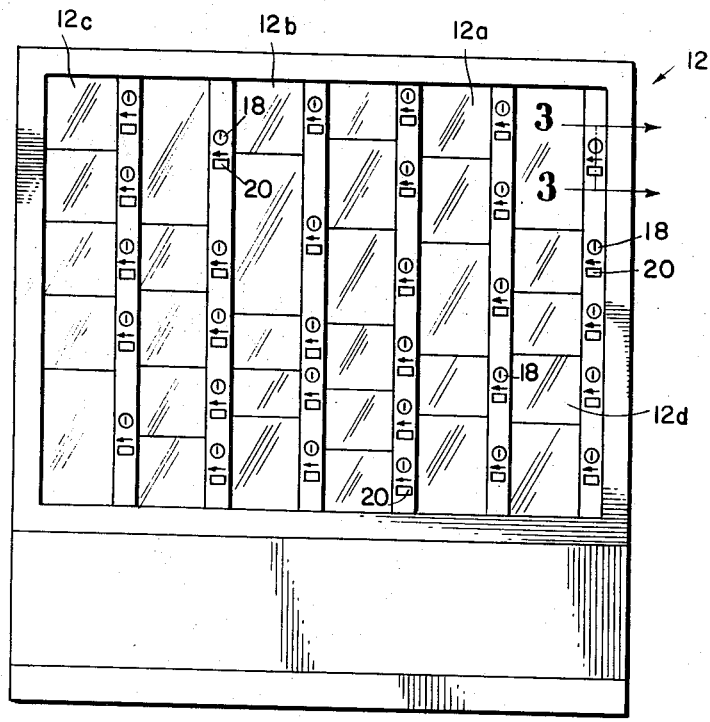
FIG. 2 is an elevation view of a plurality of display cases which may be embodied in the merchandising system of the present invention.
Figure 3:
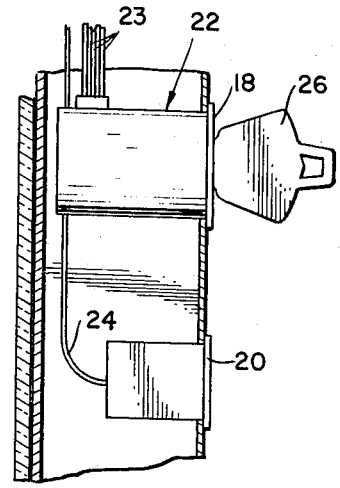
FIG. 3 is an enlarged, fragmentary, sectional view taken from FIG. 2 generally along the line 3—3 and showing a tumbler-operated switch means associated with one display case and an indicating light also associated with the display case.

Referring now to FIGS. 2 and 3, it will be seen that there is a key slot 18 and an indicating light 20 associated with each display case 12. Behind each key slot 18 is a plurality of tumbler-operated switches, indicated generally by the reference number 22, each of which is connected to the computer 10 by leads 23. Each indicating light 20 is also connected to the computer 10 by a lead 24.

A key 26 is provided each purchaser, each key being coded to identify the purchaser. That is, there is a plurality of tumbler-operated, purchaser-identifying switches associated with each display case 12, each of the purchaser-identifying switches being arranged to work with only one of several different keys 26.

Referring again to FIG. 1, it will be seen that there are illustrated four cables 30, 32, 34 and 36 connecting the display cases 12a, 12b, 12c and 12d, respectively, to the computer 10. That is, the cables 30, 32, 34 and 36 connect the tumbler-operated switches 22 and the indicating lights 20 associated with each of the display cases 12a, 12b, 12c and 12d to the computer 10.

The cashier's station 14 comprises a readout device, indicated generally by the reference number 38, and a master switch means, indicated generally by the reference number 40, having a key slot 42 which receives all of the keys 26. Preferably, the readout device 38 is arranged to provide a printed bill as indicated by the reference number 44.

The readout device 38 is connected to the computer 10 by a cable 46 and the master switch means 40 is connected to the computer 10 by a cable 48, each of the cables 46 and 48 necessarily including a plurality of lead wires.

A purchaser, upon entering the place of business served by the merchandising system of the present invention, is provided with a key 26 which is preferably numbered and which is coded in such a manner that, when the purchaser inserts the key 26 into a key slot 18 to select merchandise shown in a display case 12, the operation of the tumbler-operated switches 22 will register in the computer 10 the identity of the purchaser. That is, the use of a particular key 26 to select merchandise represented by a particular display case 12 will register in the computer the coded number of the key 26.

After the purchaser has made all of his selections using a particular key 26, he then turns the key 26 over to the cashier and the cashier inserts the key into the key slot 42 to operate the master switch means 40 which operates the computer 10 to sum the quantity of all of the merchandise selected by the purchaser using the key. Such operation of the computer 10 causes the computer 10 to operate the readout device 38 to provide a bill for the purchaser. After the purchaser has paid the bill, the cashier will use the same key to operate the master switch means 40 which again operates the computer which will, then, operate the material handling system associated with the computer to deliver the merchandise selected by the purchaser to a central loading station. The master switch means 40 is preferably so arranged that, when the key 26 is turned one way, the computer 10 will be operated to make the necessary summation, and, when the key 26 is turned in the opposite direction, the computer 10 will be operated to operate the material handling system.

The illustrated master switch means 40 is also provided with a second key slot 43 which receives all of the keys 26 and which is closed by a cover arranged to pivot over the key slot 43. The key slot 43 is cooperatively associated with tumbler-operated switches, not shown, connected to the computer 10 and arranged to abort all the purchases or orders made by a purchaser using a particular key 26. Thus, the cover is required to prevent the cashier from accidentally aborting the wrong orders by inserting keys into key slot 43 instead of key slot 42.

It will be apparent that other key slots and associated tumbler-operated switches can be provided in the master switch means 40 to expand the capability of the merchandising system. For instance, in a grocery store operation, switches could be provided to operate the computer 10 to operate the material handling system controlled by the computer either to deliver the purchased goods to a "drive-in" pickup station or a "walk-in" pickup station.

The computer 10 is preferably so arrange that, if the stock of merchandise represented by any display case 12 is exhausted, the indicating light 20 associated with that display case 12 will be energized to indicate to purchasers that that particular merchandise is unavailable. A similar indicating means, which will be discussed later in this specification, is provided to indicate to stockroom employees that particular chutes need restocking.

Figure 4:
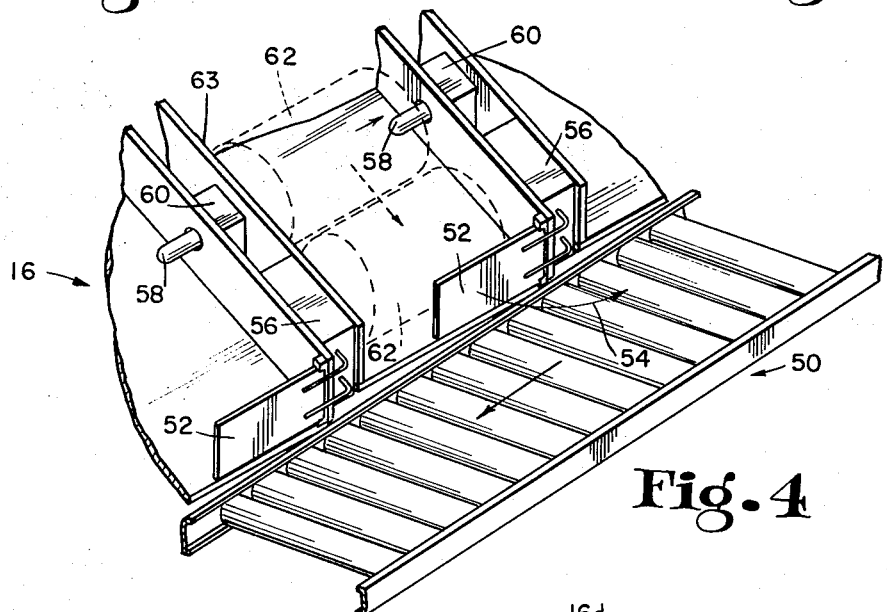
FIG. 4 is a fragmentary, perspective view showing a typical chute which contains merchandise and a roller conveyor which receives the merchandise from the chute.
Figure 5:
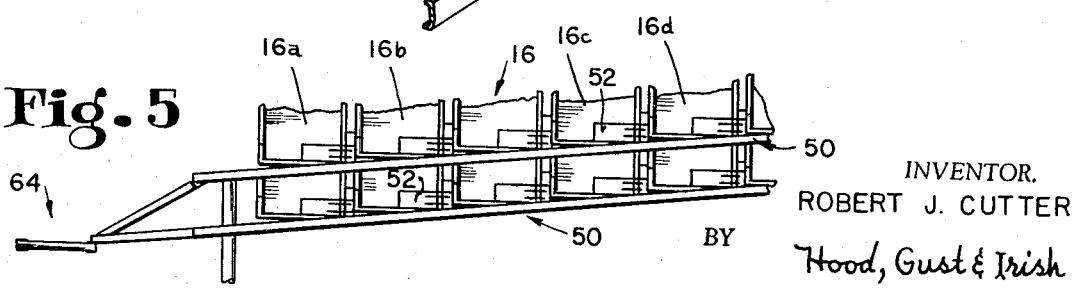
FIG. 5 is a somewhat diagrammatical view showing a pair of roller conveyors, similar to the roller conveyor shown in FIG. 4, and a plurality of chutes feeding each of the conveyors.

Referring to FIGS. 4 and 5, it will be seen that each chute 16 is arranged to feed mechandise to a central conveyor, indicated generally by the reference number 50. In the illustrative embodiment, each chute 16 is a gravity-type chute and the central conveyors 50 are gravity-type conveyors.

A gate 52 is located at the botom of each chute 16 and arranged to pivot out over the central conveyor 50 as indicated by the arrow 54 (FIG. 4) to provide space on the conveyor 50 for the merchandise leaving the chute 16. That is, the gate 52 temporarily holds or blocks merchandise moving down the conveyor 50 to provide space on the conveyor for merchandise leaving the chute 16. In the illustrative embodiment, each gate 52 is pivoted outwardly to release the merchandise in the chute 16 associated with the gate by a device 56 which may be a solenoid or the like which is operated by inputs from the computer 10.

Associated with each gate 52 is a movable holder 58 which extends into the chute 16 associated with the gate 52 when the gate is open and which is withdrawn from the chute when the gate is closed. Each holder 58 is operated by a device 60 which may be a solenoid or the like connected to the circuit of the associated gate-operating device 56.

The gate 52 and the holder 58 associated with each chute 16 cooperate to permit the selected quantity of merchandise to move from the chute 16 onto the central conveyor 50 which is fed by the chute 16. That is, when a gate 52 in a chute 16 is opened, a predetermined quantity of merchandise, such as the can indicated by the reference number 62 in FIG. 4, may leave the chute and the balance of the merchandise in the chute is restrained by the holder 58. When the gate 52 closes, the holder 58 is withdrawn so that all of the merchandise in the chute 16 is restrained by the gate.

In the illustrative embodiment, the holder 58 is arranged to squeeze or urge the can 62 against the wall 63 of the chute 16, thereby to restrain the can against movement out of the chute.

Of course, a merchandising system may include as many central conveyors 50 as are required to handle the flow of merchandise from the chutes 16 to a central loading station, such as the central loading station indicated by the reference number 64 in FIG. 5. The purchaser may pick up his purchases at the central loading station 64 or the merchandise selected by the purchaser may be sacked and boxed at the central loading station 64 and then conveyed by other conveyor means, not shown, to another loading station where the purchaser may pick it up and place it in his automobile.

Referring again to the block diagram of FIG. 1, the preferred manner in which the merchandising system of the present system may be used will be further discussed.

It will be assumed, for purposes of this description, that a purchaser has selected merchandise from each of the display cases 12a, 12b, 12c and 12d. After the purchaser has paid the cashier the amount indicated on the bill 44, and the cashier has operated the master switch means 40 to cause the computer to operate the material handling system, the merchandise slected by the purchaser will leave the chutes 16a, 16b, 16c and 16d and move onto a central conveyor 50 where it is conveyed to a central loading station, such as the station 64. Specifically, computer 10 will operate the gates 52 associated with each of the chutes 16a, 16b, 16c and 16d to permit the merchandise to leave the chutes. Preferably, the computer 10 will operate the gates 52 in the chutes 16 closest to the central loading station first and the gates in the chutes 16 farthest away from the central loading station last, thereby providing an even flow of the material along the central conveyor 50. Referring to FIG. 5, therefore, it will be seen that the gate 52 for the chute 16a is operated before the gate 52 for the chute 16b, the gate 52 for the chute 16b is operated before the gate 52 for the chute 16c and the gate 52 for the chute 16c is operated before the gate for the chute 16d.

Referring now to FIGS. 6 and 7, a second chute structure, indicated generally by the reference numeral 70, will be discussed.

The chute structure 70 comprises a generally flat plate 72 having a plurality of transversely extending, rectilinear slots 74 formed therein, the plate 72 preferably being fabricated from stainless steeel. A plurality of longitudinally extending, upwardly opening channel members 76 are supported on the plate 72. The channel members 76 are selectively positioned on the plate 72 by screws 78 which extend through the slots 74 and wing nuts 80 which receives the screws 78 and engage the bottom surface 82 of the plate 72. The space between adjacent channel members 76 defines a chute for receiving goods, the channel members 76 being adjustably movable to determine the width of the chute.

A gate 52 and holder 58 is associated with each of the chutes provided between the channel members 76, the illustrated chutes being indicated by the reference numerals 86, 88, 90, 92, 94 and 96. In the illustrated chute structure 70, the gate actuators 56 and holder actuators 60 are carried within the channel members 76 and the wires 100 connecting the actuators 56 and 60 to the computer 10 are also carried within the channel members 76.

Each of the chutes 86, 88, 90, 92, 94 and 96 is arranged to deliver selected goods to another central conveyor 102, which is similar to the central conveyor 50 previously described. The plate 72 is connected to the conveyor 102 at the left-hand end (FIG. 6) by the bracket 104 and at the right-hand end by conventional means not shown.

It is contemplated that plates 72 up to, say, four feet wide and several channel members 76 will be provided as a kit which may be assembled to provide a plurality of chutes having desired widths. This feature will provide the necessary flexibility so that a store manager may adapt his chutes to handle different sizes of goods.

Several different features may be incorporated in the basic merchandising system disclosed herein. A few of these features will be discussed in the following paragraphs.

It will be apparent that the display casese 12 are merely a means for representing a certain type of merchandise. Thus, it is not necessary that the display case 12 contain merchandise, and, in fact, each display case 12 may contain either a picture of the merchandise or a written description of the merchandise.

It may be desirable to provide special keys to particular purchasers, such as juveniles. Such special keys could be arranged to prohibit selection of such items as tobacco, alcoholic beverages, etc.

In some cases the purchaser may desire to purchase more than one item which is represented by a display case 12. In such a case the computer 10 and the tumbler-operated switches 22 associated with the display cases 12 may be arranged so that the purchaser may insert his key into the key slot 18 next to the item desired and then turn the key as many times as the number of items desired.

An indicating light 66 which is connected to the computer 10 may be arranged adjacent the loading end of each chute as suggested in FIG. 1. Thus, the computer 10 could energize an indicating light 66 to indicate to the stockroom personnel when a particular chute must be restocked.

The merchandising system of the present invention may be so arranged that, if the purchaser had selected items of merchandise which he later decides that he does not want or need, the key used by the purchaser to make the selections may be used with the master switch means 40 to cancel all of the selections made by the purchaser using the key.

While there have been discussed above the principles of this invention in connection with specific apparatus, it is to be clearly understood that this description is made by way of example and not as a limitation to the scope of the invention.

What is claimed is:

1. A merchandising system comprising a plurality of display means, each of said display means representing a certain type of merchandise, switch means associated with each of said display means, a computer, each of said switch means being connected to said computer, manually actuated coded means for selectively operating each of said switch means, thereby to register in said computer the identity of a purchaser and the quantity of merchandise ordered by said purchaser from each display means, second switch means operated by said coded means, a readout device, said second switch means being connected between said computer and said readout device and effective, when operated by said coded means, to operate said computer to sum all of the purchases made by said purchaser using said coded means and to register said sum in said readout device.

2. A merchandising system as in claim 1 further comprising an indicating means associated with each of said display means, each of said means indicating means being connected to said computer and arranged to indicate a predetermined minimum quantity of available merchandise represented by an associated display means, and each of said first-mentioned switch means being effective to register in said computer the reduction of the type of merchandise represented by an associated display means when a selection is made by a purchaser.

3. A merchandising system as in claim 1 wherein each of said first-mentioned switch means and said second switch means are tumbler-operated switches, and wherein said coded means is a key arranged to operate said switches.

4. A merchandising system as in claim 1 further comprising a material handling system arranged to transport selected merchandise to a central loading station, said material handling system comprising a plurality of chutes, each of said chutes being associated with one of said display means and arranged to receive and store the merchandise represented by the display means, a gate cooperatively associated with each of said chutes, each of said gates being effective to determine the quantity of merchandise moving from its associated chute to said central loading station, means for actuating each of said gates, each of said gate actuator means being connected to and operated by said computer.

5. A merchandising system as in claim 4 wherein said material handling system further comprises a central conveyor arranged to feed selected merchandise to said central loading station, each of said chutes being arranged to feed said central conveyor, each of said gates being arranged selectively to block the flow of merchandise from its associated chute onto said central conveyor.

6. A merchandising system as in claim 5 wherein said chutes are gravity-type chutes and wherein said central conveyor is a gravity-type conveyor.

7. A merchandising system as in claim 5 wherein each of said gates is located at the juncture of its associated chute and said central conveyor, each of said gates being pivotally connected to its associated chute and arranged, when operated by said computer, to swing outwardly over said central conveyor to provide space on said conveyor for the merchandise leaving said chute while said gate is open.

8. A merchandising system as in claim 5 wherein said material handling system further comprises a merchandise holder disposed in each of said chutes and cooperatively associated with the gate disposed in said chute, means for moving each of said holders into a position to block its associated chute when the gate in said chute is open, thereby to hold all the merchandise in the chute which has not been selected to move out of the chute, and means for deactivating each of said holders when the gate in said chute is closed, whereby the merchandise in the chute is restrained by the gate.

9. A merchandising system as in claim 4 wherein said plurality of chutes comprises a generally flat plate member, a plurality of longitudinally extending channel members carried on the top surface of said plate, and means for selectively and adjustably positioning said channel members on said plate.

10. A merchandising system as in claim 9 wherein said plate is provided with a plurality of transversely extending slots formed therein and wherein said positioning means comprises a plurality of fastening means, each of which is arranged to penetrate one of said channel members slidably to engage one of said slots.

References Cited

UNITED STATES PATENTS

| | | | |
|---|---|---|---|
| 1,981,783 | 11/1934 | De Bussey | 235—91.14 |
| 2,545,670 | 3/1951 | Noonan | 235—91.14 |
| 2,564,575 | 8/1951 | Just | 235—91.14 |
| 2,645,416 | 7/1953 | Massa | 235—91.14 |
| 3,304,416 | 2/1967 | Wolf | 235—92 |

THOMAS A. ROBINSON, Primary Examiner

U.S. Cl. X.R.

235—91; 186—1; 340—147